United States Patent [19]

Leitz et al.

[11] 4,071,772
[45] Jan. 31, 1978

[54] APPARATUS FOR MEASUREMENT OF MECHANICAL ABERRATIONS AFFECTING STEREOSCOPIC IMAGE ANALYSIS

[75] Inventors: Ludwig Leitz; Knut Heitmann, both of Wetzlar; Horst Schmidt, Nauborn, all of Germany

[73] Assignee: Ernst Leitz GmbH, Wetzlar, Germany

[21] Appl. No.: 625,030

[22] Filed: Oct. 23, 1975

[30] Foreign Application Priority Data

Nov. 20, 1974 Germany .............................. 2454883

[51] Int. Cl.² ...................... G02B 27/38; G01C 11/12
[52] U.S. Cl. ................................... 250/558; 250/550; 356/4; 356/163
[58] Field of Search ....................... 356/4, 5, 163, 169; 250/201, 204, 237 G, 558, 550; 95/44 C; 350/162 SF

[56] References Cited

U.S. PATENT DOCUMENTS

| | | | |
|---|---|---|---|
| 3,347,129 | 10/1967 | Lohringer | 356/4 |
| 3,499,711 | 3/1970 | Argyle | 356/5 |
| 3,553,455 | 1/1971 | Sato et al. | 250/201 |
| 3,663,105 | 5/1972 | Anderson | 356/4 |
| 3,804,525 | 4/1974 | Caudill | 250/204 |
| 3,891,321 | 6/1975 | Hock | 250/237 G |

Primary Examiner—Alfred E. Smith
Assistant Examiner—David K. Moore
Attorney, Agent, or Firm—Gilbert L. Wells

[57] ABSTRACT

Apparatus to automatically analyze stereoscopic images comprising the determination of the maximum degree of correlation between two similar images of the same object projected by two objectives, for instance in a rangefinder, wherein the two images are superimposed on one or two spatial frequency filters identical in their structures, and wherein the particular generated superimposition signal, is preferably applied to a particular photoelectric detector and wherein the output signals from the latter are used for display and/or control purposes. The apparatus is improved by a system (20,20',21,21',22-25; 30-34) for generating a reference beam indicating mechanical changes affecting the image position of at least one of the measuring beams, at least one photoelectric detector (28,29;40) being associated with the one reference beam, the output signals from the one detector corresponding to the mechanical changes being used to display and/or correct the changes or the effects of same.

17 Claims, 4 Drawing Figures

APPARATUS FOR MEASUREMENT OF MECHANICAL ABERRATIONS AFFECTING STEREOSCOPIC IMAGE ANALYSIS

CROSS-REFERENCES TO RELATED APPLICATIONS

U.S. Pat. Nos. 3,499,711 and 3,553,455 are incorporated herein to show the state of the art of Automatic Binocular Rangefingers.

The disclosure of assignee's copending application Ser. No. 661,761, filed Feb. 26, 1976 which is a continuation of Ser. No. 480,825, filed June 19, 1974, which in turn is a continuation of application Ser. No. 309,809, filed Nov. 27, 1972, and corresponding German Published application No. 2,158,761, are incorporated herein to show the state of the art of binocular rangefinders with optical correlators in which two measurement beams comprising the object radiation are guided either in common or each separately to a measurement grating on which the object images are produced.

BACKGROUND OF THE INVENTION

The present invention relates to apparatus for the automatic analysis of stereoscopic images together with the determination of the maximum degree of correlation of two similar images from the same object projected by two objectives, for instance for a range finder. The two images in the apparatus are superimposed on one or two spatial frequency filters indentical in their structures, and each particular supermposition signal generated preferably is applied to a particular photoelectric detector and the output signals of these photoelectric detectors are used for display and/or control purposes.

It is known to construct binocular rangefinders so as to eliminate any mechanical assembly changes possibly leading to spurious measurement results. According to this method of construction, a biaxial collimator is used with the help of which two illuminating indexes are projected into both beams in the direction of the incident object beam, the relative position of which with reference to the image position of the object is determined by means of oculars and compared by same.

German published application No. 2,158,761 and application Ser. No. 480,825 disclose a binocular rangefinder with optical correlator in which the two measurment beams comprising the object radiation are guided either to common or each separately to a measurement structure for instance a grating on which they produce the object images. The light fluxes obtained from the interaction of the images with the measurement structure when there is relative motion between this structure and the images are converted by means of a photoelectric receiver system electrical signals the properties of which are a measure of the particular distance between the object and the rangefinder. They are used for display and/or control.

Prior art practice has shown that given the same base line, the apparatus of application Ser. No. 480,825 is more accurate then those of prior art, but only if the above-mentioned mechanical changes, for instance due to temperature variations, do not occur or are eliminated. The above-described visual biaxial collimator cannot be used together with an instrument comprising an optical correlator because it assumes the comparison of the relative positions of two intangible (virtual) images, such comparison however being absent in an optical correlator. Latter always presupposes the presence of a tangible (real) image besides the presence of a concrete structure for the measurement of relative positions.

SUMMARY OF THE INVENTION

The present invention addresses the problem of creating an apparatus in a binocular rangefinder with optical correlator allowing determining with sufficient accuracy the mechanical changes within said rangefinder as well as their magnitude or their influence on the measurements and eliminating them.

The object of the present invention is apparatus for the automatic analysis of stereoscopic images together with the determination of the maximum degree of correlation of the two similar images from one object projected by two objectives, for instance for application in a rangefinder. The two images are superimposed on one or two spatial frequency filter or filters identical in their structure, the particular superimposition signal so generated preferably being applied to a particular associated photoelectric detector and the output signals from the latter being used for display and/or control purposes. The apparatus of application Ser. No. 480,825 is improved by apparatus for generating a reference beam indicating mechanically effective changes acting at least on one of the measuring beams and associated with at least one photoelectric detector of which the output signals corresponding to the change(s) are used for display and/or correction of said change(s) or of the effects of same.

In one embodiment of the present invention the apparatus comprises a biaxial collimator so coupled with the measuring beams that the indexes of this collimator are imaged on at least one index of an index carrier, and at least one photoelectric detector responding to variations between the relative position of the projected index images and the index is associated with the carrier.

Advantageously the index carrier used is a structure for instance a grating the function of which is filled by the collimator structure or grating. This is especially favorable if the biaxial collimator is provided with structures or gratings as the index image determining components. In another embodiment, the apparatus comprises illuminating devices illuminating at least one spatially fixed index located in the optically conjugate plane of the system, the reference beam so generated being introduced opposite the direction of incidence of the object radiation in one measuring beam, optical means being provided to transfer the reference beam into the other beam and in the direction of incidence of the object radiation, the arrangement of the components being such that the reference beam is incident on an index carrier with at least one index, and that provision is made for at least one photoelectric detector to generate signals for the deviation of the projected index image from the nominal position. A structure for instance a grating is provided as the component determining the structure of the projected index. In the latter case a structure for instance in the form of a grating is also associated with the photoelectric detector as the index carrier.

BRIEF DESCRIPTION OF THE DRAWINGS

Embodiments of the novel apparatus are shown diagrammatically in the drawings and are described below, wherein.

DESCRIPTION OF THE PREFERRED EMBODIMENTS

Figure 1:
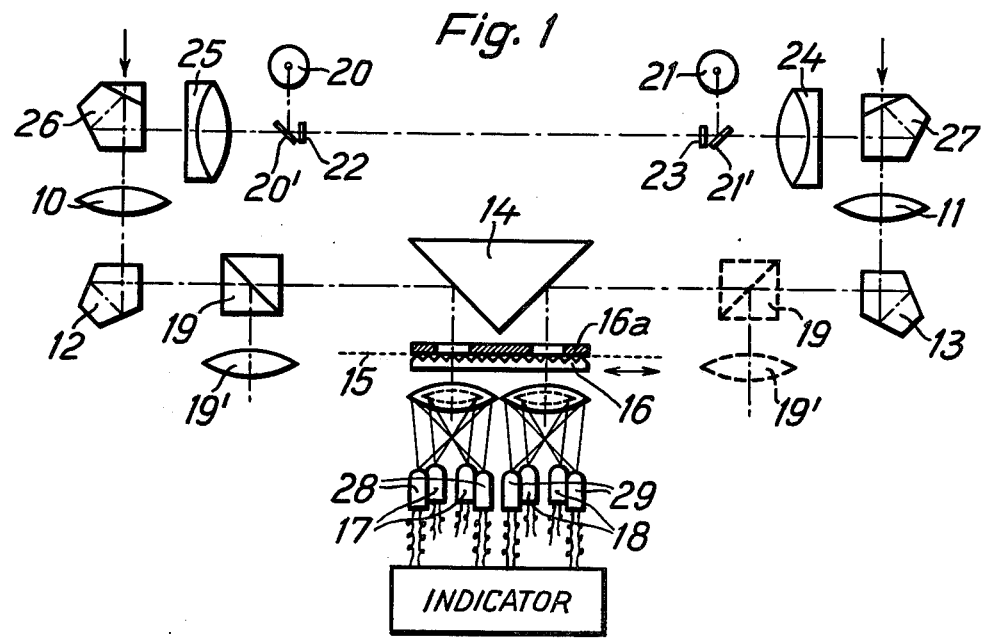
FIG. 1 is a side elevation view partly in section of the novel binocular rangefinder of the present invention, with optical correlator and biaxial collimator.

FIG. 1 shows a binocular rangefinder according to the present invention, which operates as does the rangefinder of application Ser. No. 480,825. The object, not shown but indicated by the arrows directed versus objectives 10 and 11, is imaged by two objectives 10 and 11 through deflecting mirrors in the form of pentaprisms 12, 13 and also by means of a deflecting mirror inserted in between these in the form of a prism 14 in an image plane 15 in which is located a correlation structure in form of a grating 16. Grating 16 is provided with an image field stop 16a with two apertures, and is movable in the image plane. Drive means, not shown, further are provided to move screen 16 in oscillatory manner. This motion is symbolized by the double arrow. Two photoelectric detectors 17, 18 are located behind the structure, the output signals of which are used for display and/or control purposes. A splitter 19 is inserted in one of the measuring beams, allowing visual sighting and observation of the object through ocular 19'. The known and required means of an optical nature in a rangefinder for adjusting the parallalax angle, for instance, such as internal focusing lenses, rotating wedges etc., are omitted.

Figure 1A:
FIG. 1a is a detailed showing in plan view of the correlator of FIG. 1 with common structure.

Furthermore, a biaxial collimator is provided, which comprises two lamps 20, 21 with deflecting mirrors 20', 21'. Each lamp illuminates an index carrier 22, 23 and images the same through optical systems 25, 24 thus creating a reference. By means of two optical means 26, 27 constructed as pentaprisms with cemented compensation wedge, the beams leaving optical systems 25, 24 are coupled to the measuring beams and together with the latter traverse components 10 to 14 up to image plane 15. The spatial position of the collimator components, however, is such that the images generated by the collimator will not lower the quality of the measuring beam. In the embodiment shown, the collimator index images are also projected on the correlation structure 16 but in a position offset with respect to the position of the object images on the correlation structure or grating 16 (FIG. 1a). Separate photoelectric detectors 28, 29 are associated with the regions of the collimator index images, the output signals of which are a measure of mechanical change(s) affecting the image position of at least one of the measuring beams. These signals are used either to initiate compensating control or to allow computational correction.

Variations regarding the principles so far described are possible.

On the one hand, it is feasible to replace the two photoelectric detectors by a single one by providing for an alternating incidence of the two associated beams on the single photoelectric detector, possibly by introducing a dark pause. Index carriers 22, 23 are constructed both as aperture stop and as structure or grating. Again, index carriers 22, 23 are imaged, not on correlation structure 16 located in image plane 15, but rather on one or several further structures or gratings coupled directly or indirectly as regards their motion with structure 16. The collimator indexes also are imaged on a slit or aperture stop in lieu of a structure or grating. Again, spectral separation of the light fluxes associated with the measuring and reference beams is also feasible.

Figure 2:
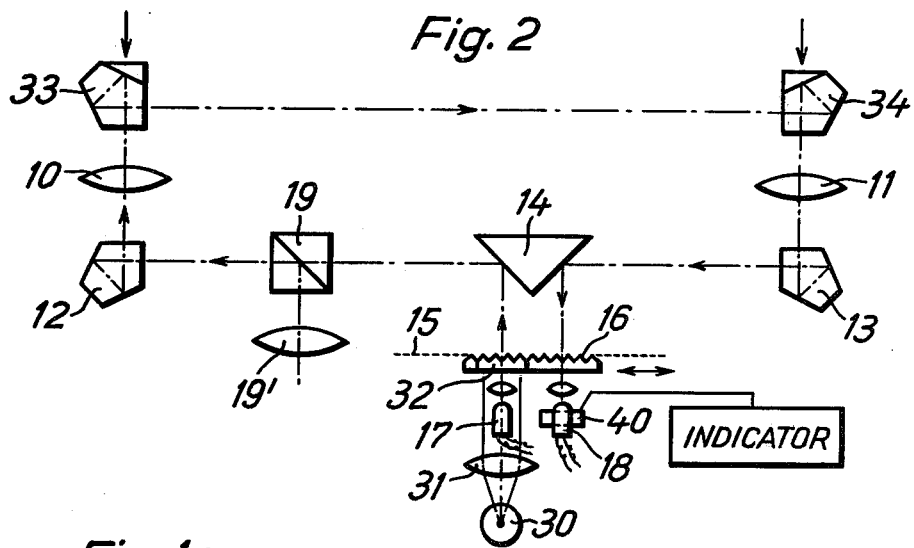
FIG. 2 is a side elevation view, partly in section, of another embodiment of the novel binocular rangefinder of the present invention with an optical correlator and a single projector.

FIG. 2 shows an embodiment of the concept of the present invention in which components 10-14 and 16-18 correspond to those of FIG. 1. In this instance an illuminating system consisting of lamp 30 and condensor 31 projects a structure or grating 32, spatially fixed in a conjugate plane, in the direction opposite to the incidence of the object radiation into the left measuring beam, thus creating a reference. By means of a pentaprism 33 completed by a cemented wedge and spectrally selectively reflecting and therefore preventing light from emanating in the direction of the object and decoupling the projecting beam from this measuring beam by deflection. Therewith the projection beam is guided in the direction of the other measuring beam where a corresponding pentaprism 34 couples the projection beam to the other meauring beam.

Figure 2A:
FIG. 2a is a detailed showing a plan view at the image plane of the correlator of FIG. 2 with common detection structure.

The projection beam, together with the other measuring beam, pass through the next arrangement until reaching the image plane 15 where an image of the projection beam is produced on structure or grating fitted to structure or grating 32. The light fluxes obtained from the interaction of the projection image and structure are converted into electrical signals by means of a photoelectric detector system 40 which, similarly to what was explained above, comprises at least one photoelectric detector, these signals being used for display and/or for eliminating mechanical changes affecting the image position of at least one of the measuring beams. As seen from FIG. 2a, the correlation grating 16 itself is used here as the detecting structure for the projection beam.

Again variations are feasible with the embodiment of FIG. 2. For instance, a single or double slit diaphragm may replace the detection structure for the projection beam. Also, the arrangement of one or both of the structures or stops associated with the projection beam is feasible in planes other than the shown conjugate one. Further, an oscillating index carrier may be used as the structure determining component of the projected index. In this instance the index carrier associated with the photoelectric detector must be spatially fixed.

Lastly, it must be observed that in lieu of at least one photoelectric detector together with its associated structure or grating, one may make use of a multiply subdivided photoelectric detector system, such as is known for instance as a cell array.

We claim:

1. In an apparatus for analyzing stereoscopic images and determining the maximum correlation rate of two identical images of an object, having two objectives forming said images and including at least one spatial frequency filter superimposing said images, further containing a photoelectric receiver system coordinated to said spatial frequency filter and producing electrical output signals used in indicating and/or controlling means, the improvements comprising:
   a. means generating at least one reference beam reacting on mechanical variations of said apparatus which influence the position of at least one image projected by said objective onto said spatial frequency filter, and projecting an image of a reference mark onto said spatial frequency filter;

b. photoelectric receiver means responsive to light fluxes leaving said spatial frequency filter and being associated to said image of said reference mark projected by said reference beam biased by said mechanical variations and producing electrical output signals corresponding to said mechanical variations; and c. indicator means fed by said electrical output signals for indicating said mechanical variations.

2. In an apparatus for analyzing stereoscopic images and determining the maximum correlation rate of two identical images of an object, having two objectives forming said images and including at least one spatial frequency filter superimposing said images, further containing a photoelectric receiver system coordinated to said spatial frequency filter responsive to light fluxes leaving said spatial filter and producing electrical output signals used in indicating and/or controlling means, the improvement comprising:

a. means generating at least one reference beam reacting on mechanical variations of said apparatus which influence the position of at least one image projected by said objective onto said spatial frequency filter, and projecting an image of a reference mark onto said spatial frequency filter;

b. photoelectric receiver means responsive to light fluxes leaving said spatial frequency filter and being associated to said image of said reference mark projected by said reference beam biased by said mechanical variations and producing electrical output signals corresponding to said mechanical variations; and c. means for correcting said mechanical variations actuated by said electrical output signals.

3. In an apparatus for analyzing stereoscopic images and determining the maximum correlation rate of two identical images of an object, having two objectives forming said images and including at least one spatial frequency filter superimposing said images, further containing a photoelectric receiver system coordinated to said spatial frequency filter responsive to light fluxes leaving said spatial frequency filter and/or controlling means, the improvement comprising:

a. means generating at least one reference beam reacting on mechanical variations of said apparatus which influence the position of at least one image projected by said objective onto said spatial frequency filter;

b. photoelectric receiver means responsive to light fluxes leaving said spatial frequency filter and being associated to said image of said reference mark projected by said reference beam biased by said mechanical variations and producing electrical output signals corresponding to said mechanical variations; and c. means for correcting the effects of said mechanical variations actuated by said electrical output signals.

4. Apparatus as defined in claim 1, comprising a biaxial collimator (20, 20'; 21, 21'; 22-25) with the indexes of said collimator imaged on an index carrier (16) provided with at least one index and at least one photoelectric detector (28,29) responding to changes in the relative position between the index images and the index associated with said carrier.

5. Apparatus as defined in claim 4, wherein said index carrier (16) is a structure.

6. Apparatus as defined in claim 4, wherein said index carrier (16) is a grating.

7. Apparatus as defined in claim 4, wherein structure (16) is provided in common as index carrier for the collimator images and for the measuring beams.

8. Apparatus as defined in claim 4, wherein a grating (16) is provided in common as index carrier for the collimator images and for the measuring beams.

9. Apparatus as defined in claim 4, wherein said biaxial collimator comprises structures defining said index image determining components (23,22).

10. Apparatus as defined in claim 4, wherein said biaxial collimator comprises gratings defining said index image determining components (23,22).

11. Apparatus as defined in claim 1, comprising illuminating system (30,31) having at least one index (32) spatially fixed in an optically conjugate plane of the arrangement with illumination means for generating a reference beam to be introduced into one of the measuring beams in a direction opposite to that of the incidence of the object radiation, optical means (33,34) provided to transfer the reference beam into the other measuring beam and in a direction of incidence of the object radiation, said reference beam having means for impinging upon an index carrier (16) with at least one index, and at least one photoelectric detector (40) generating signals corresponding to the offset of the projected index image from the nominal position.

12. Apparatus as defined in claim 11, wherein a grating (32) is provided as the component determining the structure of the projected index.

13. Apparatus as defined in claim 11, wherein structure (32) is provided as the component determining the structure of the projected index.

14. Apparatus as defined in claim 11, wherein a grating (16) is associated as index carrier with the photoelectric detector.

15. Apparatus as defined in claim 11, wherein a structure (16) is associated as index carrier with the photoelectric detector.

16. Apparatus as defined in claim 2 comprising illuminating system (30, 31) having at least one index (32) spatially fixed in an optically conjugate plane of the arrangement with illumination means for generating a reference beam to be introduced into one of the measuring beams in a direction opposite to that of the incidence of the object radiation, optical means (33, 34) provided to transfer the reference beam into the other measuring beam and in a direction of incidence of the object radiation, said reference beam having means for impinging upon an index carrier (16) with at least one index, and at least one photoelectric detector (40) generating signals corresponding to the offset of the projected index image from the nominal position.

17. Apparatus as defined in claim 3, comprising illuminating system (30, 31) having at least one index (32) spatially fixed in an optically conjugate plane of the arrangement with illumination means for generating a reference beam to be introduced into one of the measuring beams in a direction opposite to that of the incidence of the object radiation, optical means (33, 34) provided to transfer the reference beam into the other measuring beam and in a direction of incidence of the object radiations, said reference beam having means for impinging upon an index carrier (16) with at least one index, and at least one photoelectric detector (40) generating signals corresponding to the offset of the projected index image from the nominal position.

* * * * *